United States Patent
Berfield et al.

(10) Patent No.: US 6,494,544 B1
(45) Date of Patent: Dec. 17, 2002

(54) AXLE AND WHEEL MOUNTING SYSTEM FOR A WET/DRY VACUUM CLEANER

(75) Inventors: Robert C. Berfield, Jersey Shore, PA (US); Ronald Griffin, Williamsport, PA (US); David Martinez, Williamsport, PA (US)

(73) Assignee: Shop Vac Corporation, Williamsport, PA (US)

( * ) Notice: Subject to any disclaimer, the term of this patent is extended or adjusted under 35 U.S.C. 154(b) by 0 days.

(21) Appl. No.: 09/657,156

(22) Filed: Sep. 7, 2000

(51) Int. Cl.[7] .............................................. B60B 23/00
(52) U.S. Cl. ................. 301/111.01; 301/112; 301/124.1
(58) Field of Search .............................. 301/124.1, 125, 301/126, 131, 132, 111.06, 111.05, 122, 5.1, 5.301; 16/45, 46

(56) References Cited

U.S. PATENT DOCUMENTS

| | | | | |
|---|---|---|---|---|
| 7,948 A | * | 2/1851 | Wilson | 301/126 |
| 163,963 A | * | 6/1875 | Balkema | 301/126 |
| 409,362 A | * | 8/1889 | Kenyon | 301/126 |
| 479,618 A | * | 7/1892 | Bettendorf | 301/125 |
| 567,582 A | * | 9/1896 | Faulkner et al. | 301/126 |
| 678,413 A | * | 7/1901 | Leyland | 301/111.06 |
| 685,087 A | * | 10/1901 | Balcomb | 301/126 |
| 1,468,768 A | * | 9/1923 | Vogel et al. | 301/132 |
| 1,553,054 A | | 9/1925 | Vial et al. | |
| 2,189,232 A | * | 2/1940 | Snell | 301/125 |
| 2,717,807 A | | 9/1955 | Kapp | |
| 2,876,479 A | | 3/1959 | Kaufman | |
| 3,890,020 A | | 6/1975 | Thomas | |
| 4,007,820 A | | 2/1977 | Kagata | |
| 4,033,627 A | | 7/1977 | Morroni | |
| 4,054,335 A | | 10/1977 | Timmer | |
| 4,121,871 A | | 10/1978 | Asams, Jr. | |
| 4,165,094 A | * | 8/1979 | Onda | 188/24.11 |
| 4,229,855 A | | 10/1980 | Rowe | |
| 4,392,333 A | | 7/1983 | Welsch | |
| 4,404,707 A | | 9/1983 | Walker | |
| 4,530,543 A | | 7/1985 | Keane | |
| 4,544,425 A | | 10/1985 | Provolo | |
| 4,689,848 A | | 9/1987 | Kotzin | |
| 4,888,849 A | | 12/1989 | Hult et al. | |
| 4,955,669 A | | 9/1990 | Jankevics | |
| 5,143,500 A | | 9/1992 | Schuring et al. | |
| 5,209,167 A | | 5/1993 | Donner et al. | |
| 5,222,786 A | | 6/1993 | Sovis et al. | |
| 5,340,206 A | | 8/1994 | Young | |
| 5,528,794 A | | 6/1996 | Tomasiak | |
| 5,598,605 A | | 2/1997 | Tomasiak | |
| 5,964,008 A | | 10/1999 | Lim | |
| 6,048,037 A | * | 4/2000 | Cheng | 280/47.17 |
| 6,280,001 B1 | * | 8/2001 | Parker et al. | 301/122 |
| 6,299,258 B1 | * | 10/2001 | Wright et al. | 301/124.1 |
| 6,328,320 B1 | * | 12/2001 | Walski et al. | 220/908 |

FOREIGN PATENT DOCUMENTS

FR          2607754         11/1987

\* cited by examiner

*Primary Examiner*—S. Joseph Morano
*Assistant Examiner*—Long Bao Nguyen
(74) *Attorney, Agent, or Firm*—Marshall, Gerstein & Borun

(57) ABSTRACT

A wheel mounting system for a wet/dry vacuum cleaner is disclosed. A system provides a wet/dry vacuum cleaner base having a plurality of mounting surfaces extending therefrom. First and second wheels are mounted to first and second stub shafts which are inserted through at least two of the plurality of bearing surfaces and secured thereto using set screws. Flanges on outer ends of the stub shafts secure the wheels between the flanges and wheel wells extending from the base of the vacuum cleaner. A reinforcing shaft can be telescopingly received within the first and second stub shafts in order to enable the vacuum cleaner base to support relatively heavy loads.

20 Claims, 4 Drawing Sheets

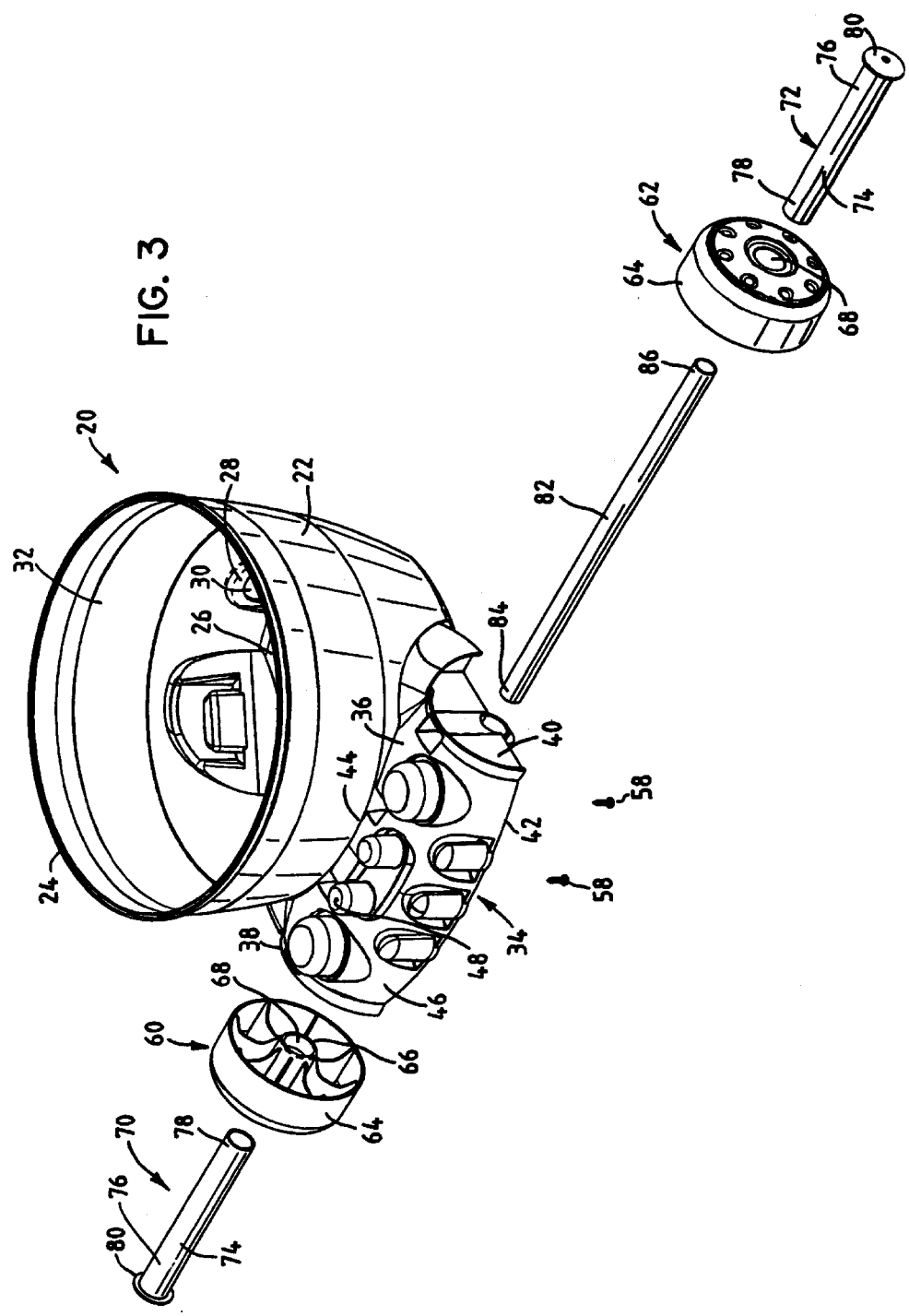

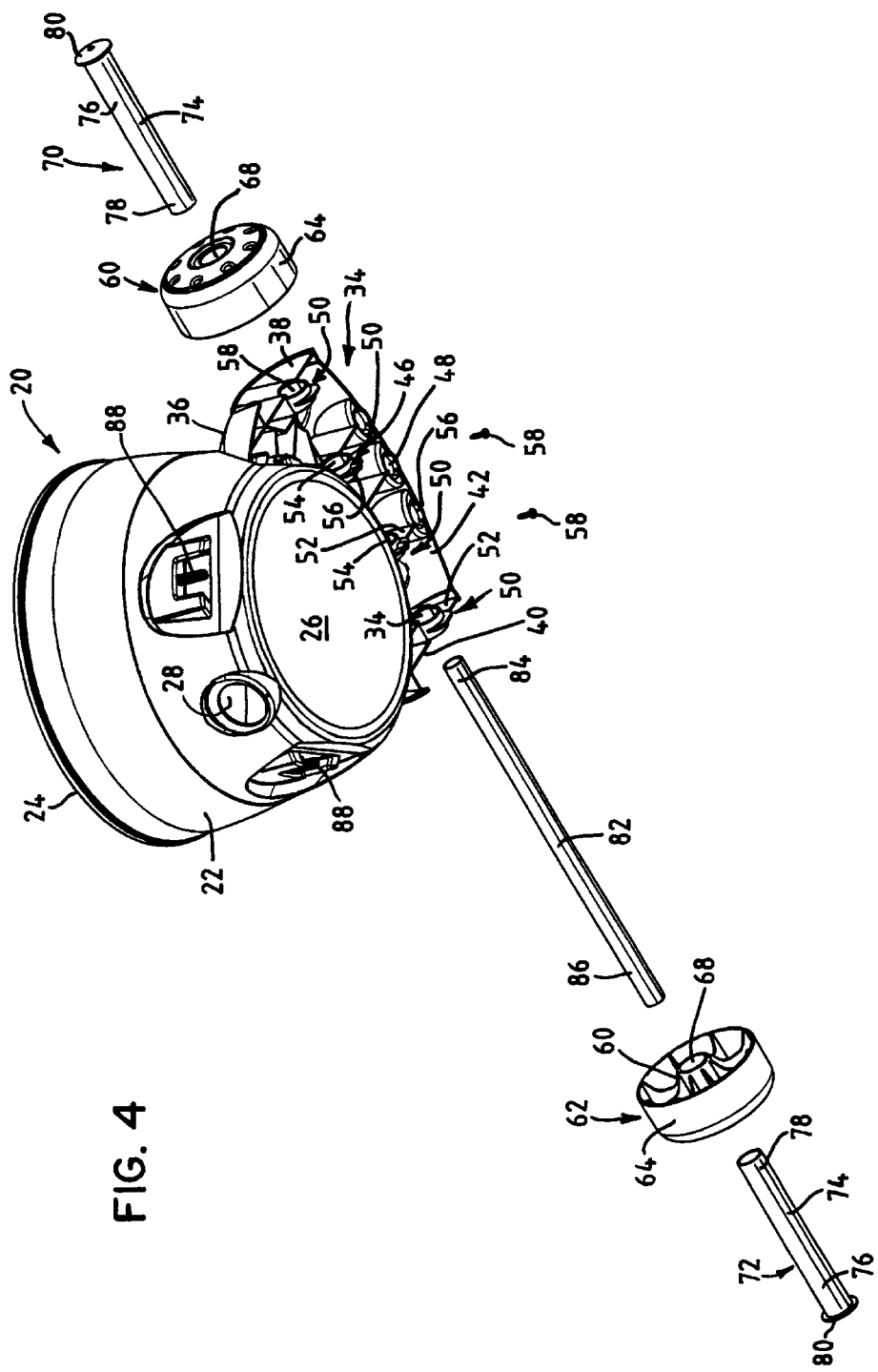

AXLE AND WHEEL MOUNTING SYSTEM FOR A WET/DRY VACUUM CLEANER

FIELD OF THE INVENTION

The invention generally relates to wet/dry vacuum cleaners and more particularly relates to apparatus and methods for mounting wheels to a wet/dry vacuum cleaner.

BACKGROUND OF THE INVENTION

Wet/dry vacuum cleaners are well known. Such devices typically include a relatively large tank adapted to receive debris in liquid, solid, or gas form and a lid enclosing the tank. The lid typically mounts a vacuum generating mechanism such as a motor driven impeller and is removable to enable the contents of the tank to be emptied.

In order to facilitate movement of the vacuum cleaner about a given work site or facility, wheels or casters are typically mounted to the base of the vacuum cleaner tank. Such wheels and casters are mounted to vacuum cleaner bases in a variety of ways.

For example, Tomasiak, U.S. Pat. No. 5,598,605, discloses a wet/dry vacuum cleaner wheel mount manufactured from flexible plastic wherein a plurality of wheels having deformable hubs are provided. More specifically, each hub of each deformable wheel includes a number of deflectable fingers terminating in canted cam surfaces. The base of the wet/dry vacuum cleaner includes apertures sized to receive the hubs of each wheel, such that when a wheel is pressed against one of the apertures, the deformable fingers deform inwardly until completely passing the aperture whereupon the deformable fingers deflect outwardly to lock the wheel in place.

It would be desirable to provide a wheel mounting system for a wet/dry vacuum cleaner which is adapted to support a relatively wide range of loads. At the same time, it would be desirable to provide a wheel mounting system for a wet/dry vacuum cleaner which would enable the vacuum cleaner to be shipped to a consumer in an unassembled state to avoid damage to the vacuum cleaner and vacuum cleaner wheel mounting system but would allow for a user to easily assemble the vacuum cleaner and wheel mounting system when received.

SUMMARY OF THE INVENTION

In accordance with one aspect of the invention, a wet/dry vacuum cleaner wheel mounting system is provided which comprises a wet/dry vacuum cleaner base, a plurality of bearing surfaces extending from the base, a shaft passing through the plurality of bearing surfaces, the shaft including flanges at first and second ends, first and second wheels mounted to the shaft between the shaft flanges and the base, and a fastener secured through the bearing surface and frictionally engaging the shaft.

In accordance with another aspect of the invention, a method of assembling a wet/dry vacuum cleaner wheel base is provided which comprises the steps of providing a wet/dry vacuum cleaner wheel base having a plurality of mounting surfaces extending therefrom, mounting a wheel to a shaft, inserting the shaft through at least two of the mounting surfaces, and securing the fastener through at least one of the mounting surfaces and against the shaft to connect the shaft and wheel to the base.

In accordance with another aspect of the invention, a wet/dry vacuum cleaner wheel mounting kit is provided which comprises a wet/dry vacuum cleaner base, a first axle adapted to be mounted to the base to support the first load, a second axle adapted to be mounted to the base to support a second load, the second load being greater than the first load, and first and second wheels adapted to be mounted to one of the first and second axles.

These and other aspects and features of the invention will become more apparent from the following detailed description when taken in conjunction with the accompanying drawings.

BRIEF DESCRIPTION OF THE DRAWINGS

FIG. 3 is a exploded view of a vacuum cleaner base and wheel mounting system constructed in accordance with the teachings of the invention; and FIG. 4 is a bottom exploded view of FIG. 3.

Figure 1:
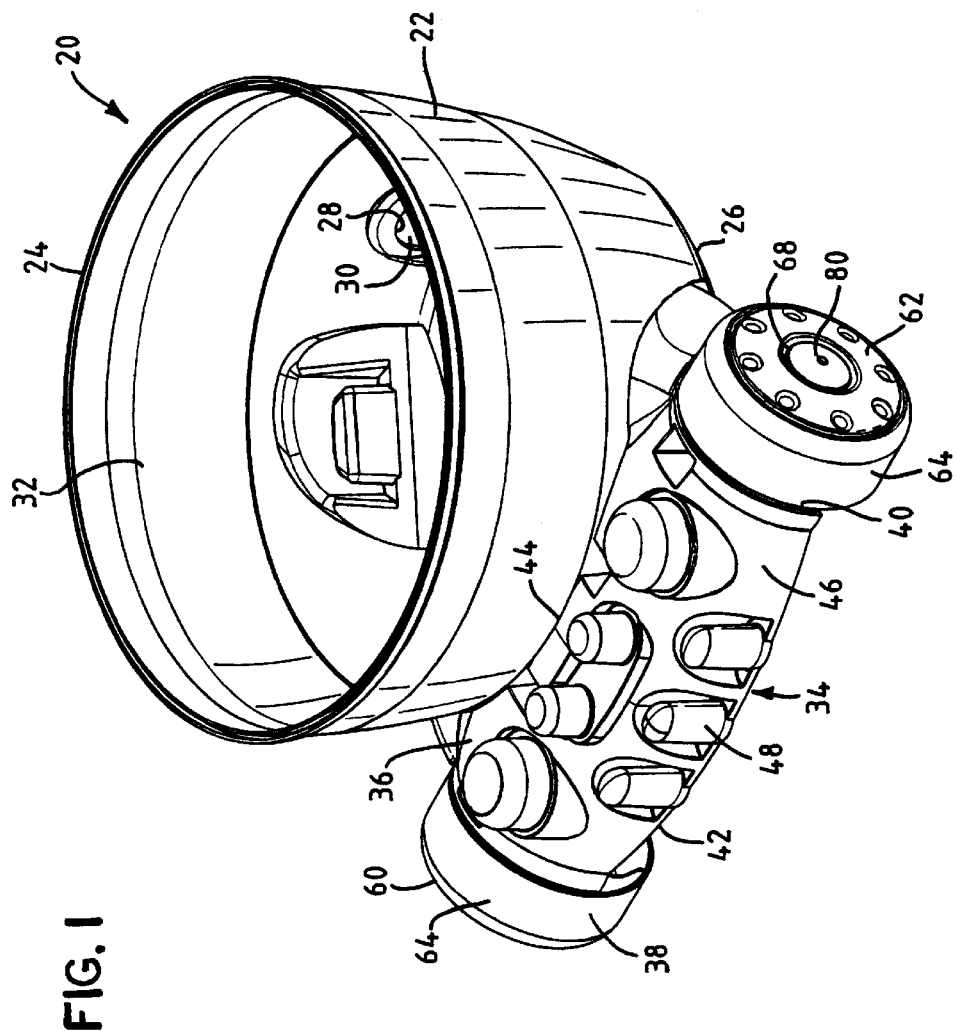
FIG. 1 is a top isometric view of a wet/dry vacuum cleaner base with a wheel mounting system constructed in accordance with the teachings of the invention.

While the invention is susceptible to various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention as defined by the appended claims.

DETAILED DESCRIPTION OF THE PREFERRED EMBODIMENTS

Referring now to the drawings, and with specific reference to FIG. 1, a wet/dry vacuum cleaner base constructed in accordance with the teachings of the invention is generally depicted by reference numeral 20. While the invention is described with reference to a wet/dry vacuum cleaner, it is to be understood that the teachings of the invention can be effectively employed with respect to other types of vacuum cleaners as well as other types of mobile, load carrying apparatus.

As shown therein, the vacuum cleaner base 20 includes a large, substantially cylindrical wall 22 having an open top 24 and a closed bottom surface 26. The base further includes a port 28 closed by a cap 30 which is removable therefrom when it is desired to drain the base 20. One of skill in the art will recognize that a lid (not shown) can be attached to the open top 24 of the cylindrical wall 22 to enclose a tank space 32. Alternatively, additional cylindrical side walls can be attached, as by spin welding, to the cylindrical wall 22 to enlarge the tank space with the lid then being attached to the additional cylindrical wall.

Extending radially from the cylindrical wall 22 is a tool caddy 34 having a top surface 36 with ends terminating in wheel wells 38 and 40. The tool caddy 34 also includes a bottom surface 42. An inner side 44 of the tool caddy 34 is directly proximate the cylindrical wall 22 and is opposite an outer side wall 46. A plurality of vacuum tool mounting heads 48 extend from the tool caddy 34.

Figure 2:
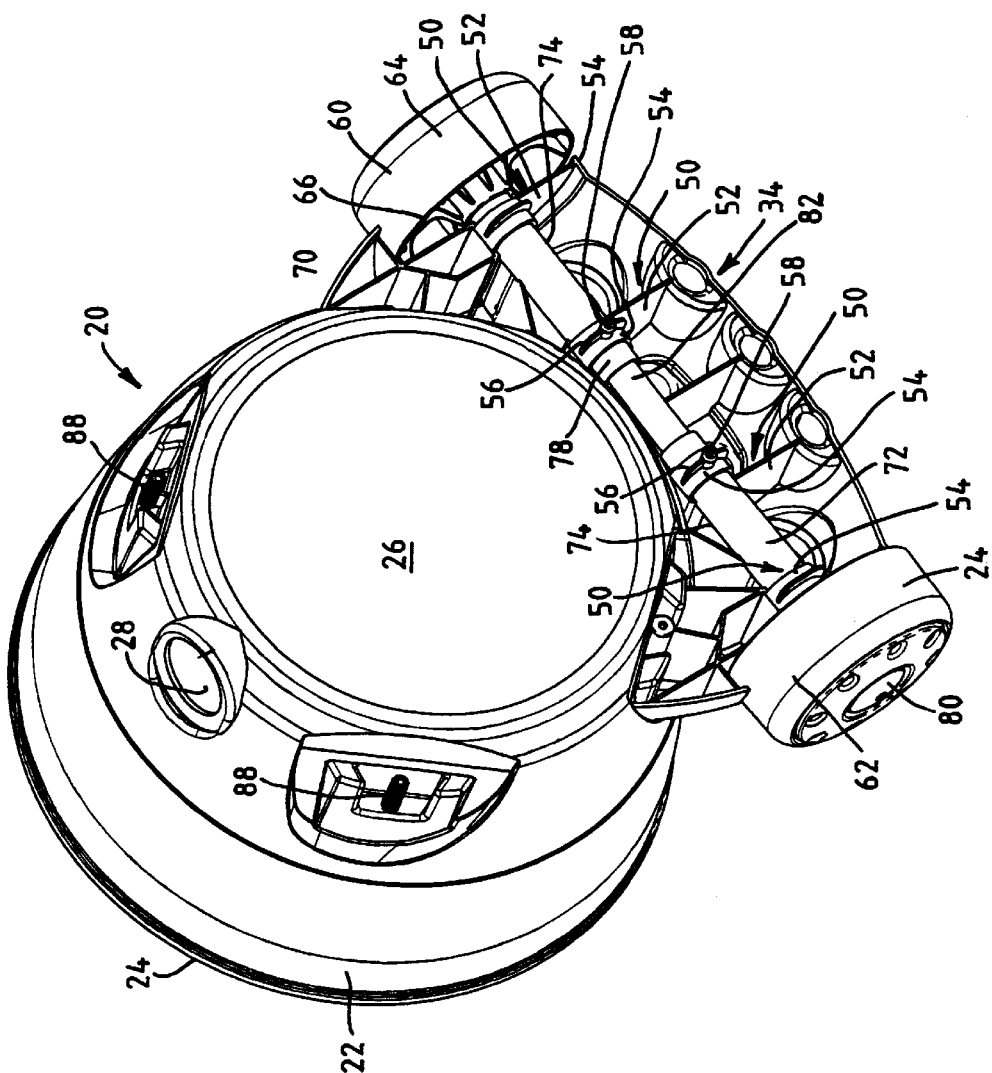
FIG. 2 is a bottom isometric view of the vacuum cleaner base and wheel mounting system depicted in FIG. 1.

With specific reference to FIG. 2, the bottom surface 42 of the tool caddy 34 is shown to include a plurality of bearing surfaces 50. Each bearing surface 50 includes a leg 52 having a circular aperture 54 therein. In the depicted embodiment four such bearing surfaces 50 are depicted, but it is to be understood that in alternative embodiments, a different number of such mounting devices can be provided. In the depicted embodiment, the two inner bearing surfaces 50 include fastener receptacles 56 adapted to receive fasteners 58 as described in further detail herein. The tool caddy 34 and plurality of bearing surfaces 50 are preferably manufactured from injection molded plastic.

With reference now to FIGS. 3 and 4, the manner in which wheels 60 and 62 are attached to the base 20 is depicted. As shown therein, each wheel 60, 62, includes an outer circumference 64 and an inner hub 66 having an aperture 68. Each wheel 60, 62 can be mounted to the base 20 in at least two ways. According to a first axle system, stub shafts 70, 72 can be employed. Each stub shaft 70, 72 includes an elongate hollow cylinder 74 having a first end 76 and a second end 78. An enlarged diameter flange 80 is provided at each first end 76. As shown in the comparison between FIGS. 2 and 3, each stub shaft 70, 72 is sufficiently long to pass through at least two of the bearing surfaces 50. More specifically, once a wheel 60, 62 is mounted on to a stub shaft 70, 72 by having the hollow cylinder 74 pass through the aperture 68, and the hollow cylinder 74 is inserted through first and second bearing surfaces 50, one of the fasteners 58 is inserted through the fastener receptacle 56 such that the fastener 58 frictionally engages an outer surface of the hollow cylinder 74. In so doing, the hollow cylinder 74 is secured against rotational longitudinal, and lateral movement. In addition, in so doing, the wheels 60, 62 are secured on the hollow cylinder 74 between one of the wheel wells 38, 40, and one of the flanges 80. Each stub shaft 70, 72 is preferably manufactured from plastic, although other materials such as aluminum and steel are possible.

In the event that relatively heavy loads are to be carried by the vacuum cleaner base 20, a second axle system can be employed. In such a system, a reinforcing shaft 82 having first and second ends 84 and 86 is telescopingly inserted into the hollow interiors 74 of stub shafts 70 and 72. More specifically, once one wheel 60, 62 and one stub shaft 70 and 72 are secured to the vacuum cleaner base, the reinforcing shaft 82 can be inserted through the opposite side of the vacuum cleaner base 20 through all of the bearing surfaces 50. Subsequently, the second of wheels 60 and 62 and stub shafts 70 and 72 can be attached to the wheel base with the hollow cylinder 74 of the second stub shaft 70, 72 surrounding the reinforcing shaft 82. The reinforcing shaft 82 is preferably manufactured from a suitable strong material such as steel, although other materials are possible.

While the foregoing system can be used to mount multiple wheels to the vacuum cleaner base 20, the vacuum cleaner base 20 is depicted with the first and second mounting legs 88 which are adapted to support first and second casters (not shown) to facilitate the steering of the vacuum cleaner base 20.

In operation, the invention provides a wet/dry vacuum cleaner wheel mounting system and method of assembling a wet/dry vacuum cleaner wheel base adapted to carry a wide range of loads. In one embodiment, the tool caddy 34 is integrally molded to the vacuum cleaner base 20 and can be shipped to a consumer in one piece. Once the consumer receives the vacuum cleaner package, wheels 60 and 62 can be assembled to the vacuum cleaner base 20 using either the stub shafts 70, 72, or the stub shafts 70, 72 in conjunction with the reinforcing shaft 82.

What is claimed is:

1. A wet/dry vacuum cleaner wheel mounting system, comprising:
   a wet/dry vacuum cleaner base;
   a plurality of bearing surfaces extending from the base;
   a uniformly shaped shaft passing through the plurality of bearing surfaces, the shaft including flanges at first and second ends;
   first and second wheels mounted to the shaft between the shaft flanges and the base; and
   a fastener secured through each bearing surface and frictionally engaging the shaft.

2. The wet/dry vacuum cleaner wheel mounting system of claim 1 wherein first and second stub shafts are provided, each stub shaft including a flange at a first end, and wherein the first and second wheels are mounted to the first and second stub shafts, respectively.

3. The wet/dry vacuum cleaner wheel mounting system of claim 2 wherein the first and second stub shafts are hollow, and further including a reinforcing shaft telescopingly received within the first and second stub shafts.

4. A wet/dry vacuum cleaner wheel mounting system comprising:
   a wet/dry vacuum cleaner base;
   a plurality of bearing surfaces extending from the base;
   a shaft passing through the plurality of bearing surfaces, the shaft including flanges at first and second ends;
   first and second wheels mounted to the shaft between the shaft flanges and the base; and
   a fastener secured through each bearing surface and frictionally engaging the shaft;
   wherein first and second stub shafts are provided, each stub shaft including a flange at a first end, and wherein the first and second wheels are mounted to the first and second stub shafts, respectively, and wherein four bearing surfaces extend from the base, each stub shaft being mounted in two of the bearing surfaces.

5. The wet/dry vacuum cleaner wheel mounting system of claim 2 further including first and second wheel wells extending from the base, each wheel being mounted on one of the stub shafts between one of the shaft flanges and one of the wheel wells.

6. The wet/dry vacuum cleaner wheel mounting system of claim 1 wherein the base further includes first and second mounts adapted to connect casters to the first and second mounts.

7. The wet/dry vacuum cleaner wheel mounting system of claim 4 wherein one of the bearing surfaces mounting each stub shaft includes a countersunk recess adapted to receive a head of the fastener.

8. The wet/dry vacuum cleaner wheel mounting system of claim 1 wherein the base and bearing surfaces are integrally molded together.

9. A wet/dry vacuum cleaner wheel mounting system comprising:
   a wet/dry vacuum cleaner base;
   a plurality of bearing surfaces extending from the base;
   a shaft passing through the plurality of bearing surfaces, the shaft including flanges at first and second ends;
   first and second wheels mounted to the shaft between the shaft flanges and the base;
   a fastener secured through each bearing surface and frictionally engaging the shaft; and
   a tool mounting tool caddy extending from the base, the plurality of bearing surfaces extending from the tool mounting tool caddy.

10. A method of assembling a wet/dry vacuum cleaner wheel base comprising the steps of:

providing a wet/dry vacuum cleaner wheel base having a plurality of bearing surfaces extending therefrom;

mounting a wheel to a uniformly shaped shaft;

inserting the shaft through at least two of the bearing surfaces; and securing a fastener through at least one of the bearing surfaces and against the shaft to connect the shaft and wheel to the base.

11. A method of assembling a wet/dry vacuum cleaner wheel base comprising:

providing a wet/dry vacuum cleaner wheel base having a plurality of bearing surfaces extending therefrom;

mounting a wheel to a uniformly shaped shaft;

inserting the shaft through at least two of the bearing surfaces;

securing a fastener through at least one of the bearing surfaces and against the shaft to connect the shaft and wheel to the base; and mounting a second wheel to a second shaft, inserting the second shaft through at least two of the bearing surfaces, and securing a fastener through at least one of the bearing surfaces and against the shaft to connect the second shaft and second wheel of the base.

12. The method of claim 11 wherein the first and second shafts are hollow and wherein the method further includes the step of inserting a reinforcing shaft into the first and second shafts.

13. The method of claim 11 wherein each shaft includes a flange at a first end thereof, and wherein the mounting and inserting steps are performed such that each wheel is mounted between a flange shaft and the wheel base.

14. A method of assembling a wet/dry vacuum cleaner wheel base comprising the steps of:

providing a wet/dry vacuum cleaner wheel base having a plurality of bearing surfaces extending therefrom;

mounting a wheel to a uniformly shaped shaft;

inserting the shaft through at least two of the bearing surfaces; and securing a fastener through at least one of the bearing surfaces and against the shaft to connect the shaft and wheel to the base;

wherein the providing step is performed by integrally molding the wheel base and plurality of bearing surfaces together.

15. A wet/dry vacuum cleaner wheel mounting kit, comprising:

a wet/dry vacuum cleaner base;

a first axle adapted to be mounted to the base to support a first load;

a second axle adapted to be mounted to the base to support a second load, the second load being greater than the first load; and first and second wheels adapted to be mounted to one of the first and second axles.

16. The wet/dry vacuum cleaner wheel mounting kit of claim 15 wherein the first axle includes first and second stub shafts.

17. The wet/dry vacuum cleaner wheel mounting kit of claim 16 wherein the second axle includes a reinforcing shaft that is telescopingly received within the first and second stub shafts.

18. The wet/dry vacuum cleaner wheel mounting kit of claim 15 further including a single mounting means adapted to interchangeably mount the first or second axles to the base.

19. The wet/dry vacuum cleaner wheel mounting kit of claim 18 wherein the mounting means includes a plurality of legs extending from the base, each leg including an aperture, the apertures being adapted to receive at least one of the first and second axles therein.

20. The wet/dry vacuum cleaner wheel mounting kit of claim 19 further including a plurality of fasteners adapted to be secured through the plurality of legs to frictionally secure at least one of the first and second axles to the base.

* * * * *